(12) United States Patent
Ito

(10) Patent No.: US 7,660,023 B2
(45) Date of Patent: Feb. 9, 2010

(54) FACSIMILE APPARATUS

(75) Inventor: Tomohiro Ito, Mizuho (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 898 days.

(21) Appl. No.: 10/910,378

(22) Filed: Aug. 4, 2004

(65) Prior Publication Data

US 2005/0063019 A1 Mar. 24, 2005

(30) Foreign Application Priority Data

Aug. 6, 2003 (JP) ............................. 2003-288214

(51) Int. Cl.
*H04N 1/04* (2006.01)

(52) U.S. Cl. .................. 358/400; 358/405; 358/436; 358/437

(58) Field of Classification Search ................ 358/400, 358/436, 437, 405, 468; 379/412, 93.05
See application file for complete search history.

(56) References Cited

U.S. PATENT DOCUMENTS 7,139,104 B2 * 11/2006 Okabe ...................... 358/400

2003/0048483 A1 3/2003 Okabe

FOREIGN PATENT DOCUMENTS

| EP | 1 091 520 A2 | 4/2001 |
| JP | A 10-200651 | 7/1998 |
| JP | A 2001-94684 | 4/2001 |
| JP | A 2003-51926 | 2/2003 |

* cited by examiner

*Primary Examiner*—Houshang Safaipour
(74) *Attorney, Agent, or Firm*—Oliff & Berridge, PLC

(57) ABSTRACT

A facsimile apparatus has a line I/F section that transmits and receives a signal through a network to which an exchange is connected, a modem signal detection section that detects a modem signal transmitted through the network, a ring signal detection section that detects a ring signal transmitted through the network from the exchange, a switch section that switches a signal detection mode of the line I/F section between a ring signal detection mode in which the ring signal detection section detects the ring signal and a modem signal detection mode in which the modem signal detection section detects the modem signal, and an operating state determination section that determines an operating state of the facsimile apparatus, wherein if the operating state determination section determines that the facsimile apparatus is in a standby mode, the switch section switches the signal detection mode into the ring signal detection mode.

12 Claims, 14 Drawing Sheets

FIG. 6

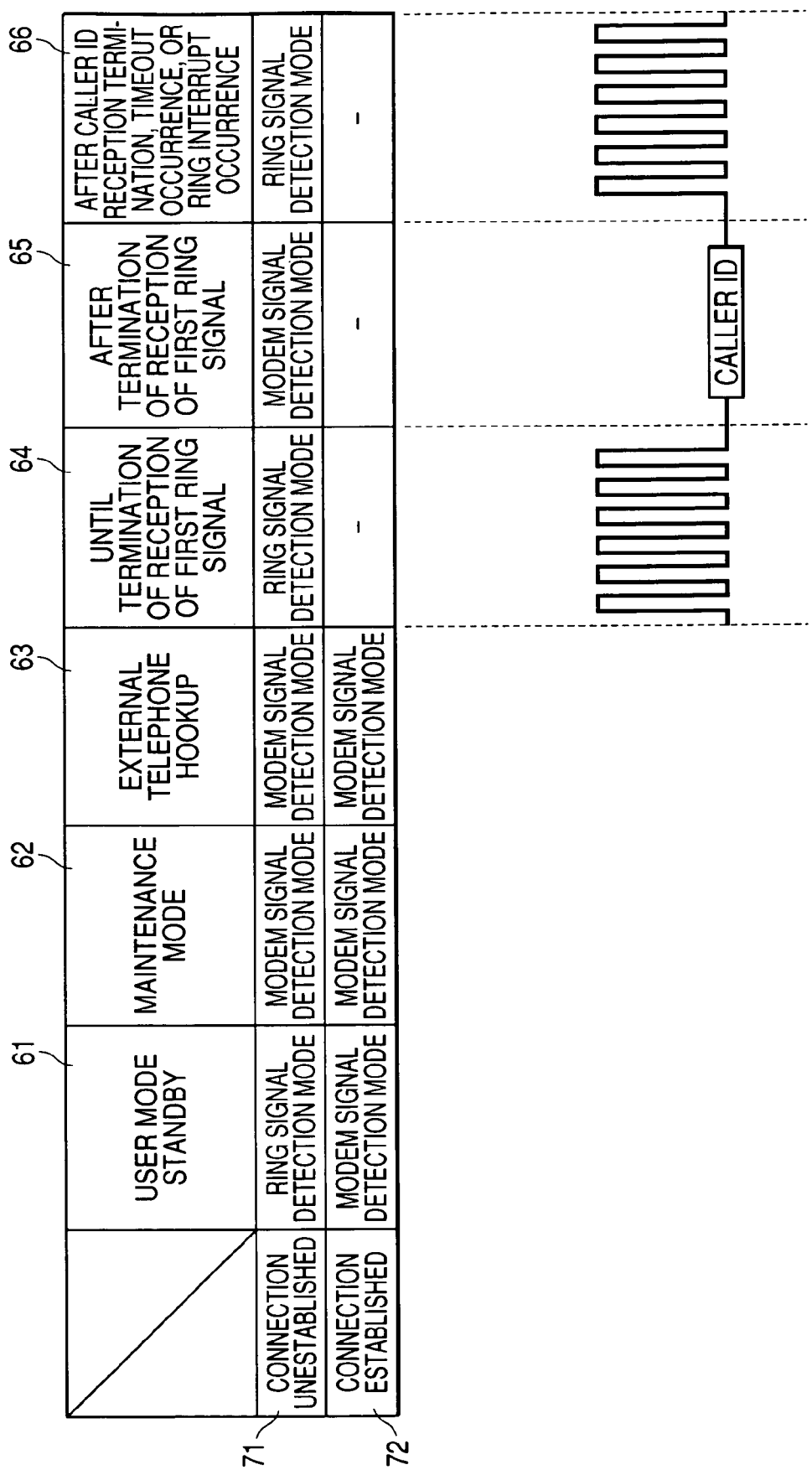

| | 61 USER MODE STANDBY | 62 MAINTENANCE MODE | 63 EXTERNAL TELEPHONE HOOKUP | 64 UNTIL TERMINATION OF RECEPTION OF FIRST RING SIGNAL | 65 AFTER TERMINATION OF RECEPTION OF FIRST RING SIGNAL | 66 AFTER CALLER ID RECEPTION TERMINATION, TIMEOUT OCCURRENCE, OR RING INTERRUPT OCCURRENCE |
|---|---|---|---|---|---|---|
| 71 CONNECTION UNESTABLISHED | RING SIGNAL DETECTION MODE | MODEM SIGNAL DETECTION MODE | MODEM SIGNAL DETECTION MODE | RING SIGNAL DETECTION MODE | MODEM SIGNAL DETECTION MODE | RING SIGNAL DETECTION MODE |
| 72 CONNECTION ESTABLISHED | MODEM SIGNAL DETECTION MODE | MODEM SIGNAL DETECTION MODE | MODEM SIGNAL DETECTION MODE | — | — | — |

FACSIMILE APPARATUS

BACKGROUND OF THE INVENTION

1. Field of the Invention

The invention relates to a facsimile apparatus and in particular to a facsimile apparatus that can switch a detection mode at an appropriate timing to reliably detect a modem signal and a ring signal.

2. Description of the Related Art

A facsimile apparatus using a semiconductor DAA (Data Access Arrangement) is available (Refer to JP-A-2003-51926 and US 2003/0048483 A1). According to the facsimile apparatus, modem signals including tone signals such as a CNG signal and a DTMF signal can be detected without using a transformer. Thus, the apparatus configuration can be simplified and miniaturized for reducing costs as compared with a facsimile apparatus in a related art using a transformer. The semiconductor DAA includes not only a detection section for detecting a modem signal, but also a detection section for detecting a ring signal.

JP-A-2003-51926 is referred to as a related art.

However, the above facsimile apparatus cannot simultaneously detect the modem signal and the ring signal. That is, the semiconductor DAA can only detect the modem signal or the ring signal at a time and therefore unless the signal detection mode as to which signal is to be detected is switched at an appropriate timing, detection of the signal results in failure.

SUMMARY OF THE INVENTION

The object of the invention is to provide a facsimile apparatus that can switch a detection mode at an appropriate timing to reliably detect a modem signal and a ring signal.

The invention provides a facsimile apparatus having: a line I/F section that transmits and receives a signal through a network to which an exchange is connected; a modem signal detection section that detects a modem signal transmitted through the network; a ring signal detection section that detects a ring signal transmitted through the network from the exchange; a switch section that switches a signal detection mode of the line I/F section between a ring signal detection mode in which the ring signal detection section detects the ring signal and a modem signal detection mode in which the modem signal detection section detects the modem signal; and an operating state determination section that determines an operating state of the facsimile apparatus, wherein if the operating state determination section determines that the facsimile apparatus is in a standby mode where the facsimile apparatus enables to be usually used, the switch section switches the signal detection mode into the ring signal detection mode.

Therefore, when the switch section switches the signal detection mode into the modem signal detection mode, the modem signal detection section detects the modem signal transmitted through the network; on the other hand, when the switch section switches the signal detection mode into the ring signal detection mode, the ring signal detection section detects the ring signal transmitted through the network from the exchange. Consequently, either the modem signal or the ring signal is selectively detected and the reliability of detecting the signal is improved.

Further, if the operating state determination section determines that the facsimile apparatus is in the standby mode, the switch section switches the signal detection mode into the ring signal detection mode and the ring signal detection section detects the ring signal.

The facsimile apparatus is provided with the switch section capable of switching the signal detection mode into the modem signal detection mode or the ring signal detection mode. Thus, either the modem signal or the ring signal is selectively detected, namely, the modem signal detection section reliably detects the modem signal in a state in which the modem signal should be detected and the ring signal detection section reliably detects the ring signal in a state in which the ring signal should be detected; the reliability of detecting the signal can be improved.

Further, if the operating state determination section determines that the facsimile apparatus is in the standby mode where the facsimile apparatus enables to be usually used and it is determined that a ring signal should be detected, the switch section switches the signal detection mode into the ring signal detection mode, so that the ring signal can be detected reliably and a ring tone can be produced in real time in response to the ring signal.

The invention also provides a facsimile apparatus having: a line I/F section that transmits and receives a signal through a network to which an exchange is connected; a modem signal detection section that detects a modem signal transmitted through the network; a ring signal detection section that detects a ring signal transmitted through the network from the exchange; a switch section that switches a signal detection mode of the line I/F section between a ring signal detection mode in which the ring signal detection section detects the ring signal and a modem signal detection mode in which the modem signal detection section detects the modem signal; and a hookup detection section that detects whether or not an external telephone connected to the facsimile apparatus is hooked up, wherein if the hookup detection section detects the external telephone being hooked up, the switch section switches the signal detection mode into the modem signal detection mode.

Therefore, when the switch section switches the signal detection mode into the modem signal detection mode, the modem signal detection section detects the modem signal transmitted through the network; on the other hand, when the switch section switches the signal detection mode into the ring signal detection mode, the ring signal detection section detects the ring signal transmitted through the network from the exchange. Consequently, either the modem signal or the ring signal is selectively detected and the reliability of detecting the signal is improved.

Further, if the hookup detection section detects the external telephone being hooked up, the switch section switches the signal detection mode into the modem signal detection mode and the modem signal detection section detects the modem signal.

The facsimile apparatus is provided with the switch section capable of switching the signal detection mode into the modem signal detection mode or the ring signal detection mode. Thus, either the modem signal or the ring signal is selectively detected, namely, the modem signal detection section reliably detects the modem signal in a state in which the modem signal should be detected and the ring signal detection section reliably detects the ring signal in a state in which the ring signal should be detected; the reliability of detecting the signal can be improved.

Further, if the hookup detection section detects the external telephone being hooked up and it is determined that a modem signal should be detected, the switch section switches the signal detection mode into the modem signal detection mode, so that the modem signal can be detected reliably.

The invention also provides a facsimile apparatus having: a line I/F section that transmits and receives a signal through a network to which an exchange is connected; a modem signal detection section that detects a modem signal transmitted through the network; a ring signal detection section that detects a ring signal transmitted through the network from the exchange; a switch section that switches a signal detection mode of the line I/F section between a ring signal detection mode in which the ring signal detection section detects the ring signal and a modem signal detection mode in which the modem signal detection section detects the modem signal; and a first ring detection section that detects a termination of the first ring signal transmitted from the exchange in the ring signal detection mode, wherein if the first ring detection section detects the termination of the first ring signal, the switch section switches the signal detection mode into the modem signal detection mode.

Therefore, when the switch section switches the signal detection mode into the modem signal detection mode, the modem signal detection section detects the modem signal transmitted through the network; on the other hand, when the switch section switches the signal detection mode into the ring signal detection mode, the ring signal detection section detects the ring signal transmitted through the network from the exchange. Consequently, either the modem signal or the ring signal is selectively detected and the reliability of detecting the signal is improved.

Further, if the first ring detection section detects the termination of the first ring signal transmitted from the exchange in the ring signal detection mode, the switch section switches the signal detection mode into the modem signal detection mode and the modem signal detection section detects the modem signal transmitted after the first ring signal.

The facsimile apparatus is provided with the switch section capable of switching the signal detection mode into the modem signal detection mode or the ring signal detection mode. Thus, either the modem signal or the ring signal is selectively detected, namely, the modem signal detection section reliably detects the modem signal in a state in which the modem signal should be detected and the ring signal detection section reliably detects the ring signal in a state in which the ring signal should be detected; the reliability of detecting the signal can be improved.

Further, if the first ring detection section detects the termination of the first ring signal in the ring signal detection mode and it is determined that a modem signal should be detected, the switch section switches the signal detection mode into the modem signal detection mode, so that the modem signal such as Caller ID data, etc., transmitted from the exchange after the first ring signal can be detected reliably.

BRIEF DESCRIPTION OF THE DRAWINGS

FIG. 6 is a drawing to show a switch table of a detection mode of a semiconductor DAA in the first embodiment of the invention;

DETAILED DESCRIPTION OF THE PREFERRED EMBODIMENTS

Figure 1:
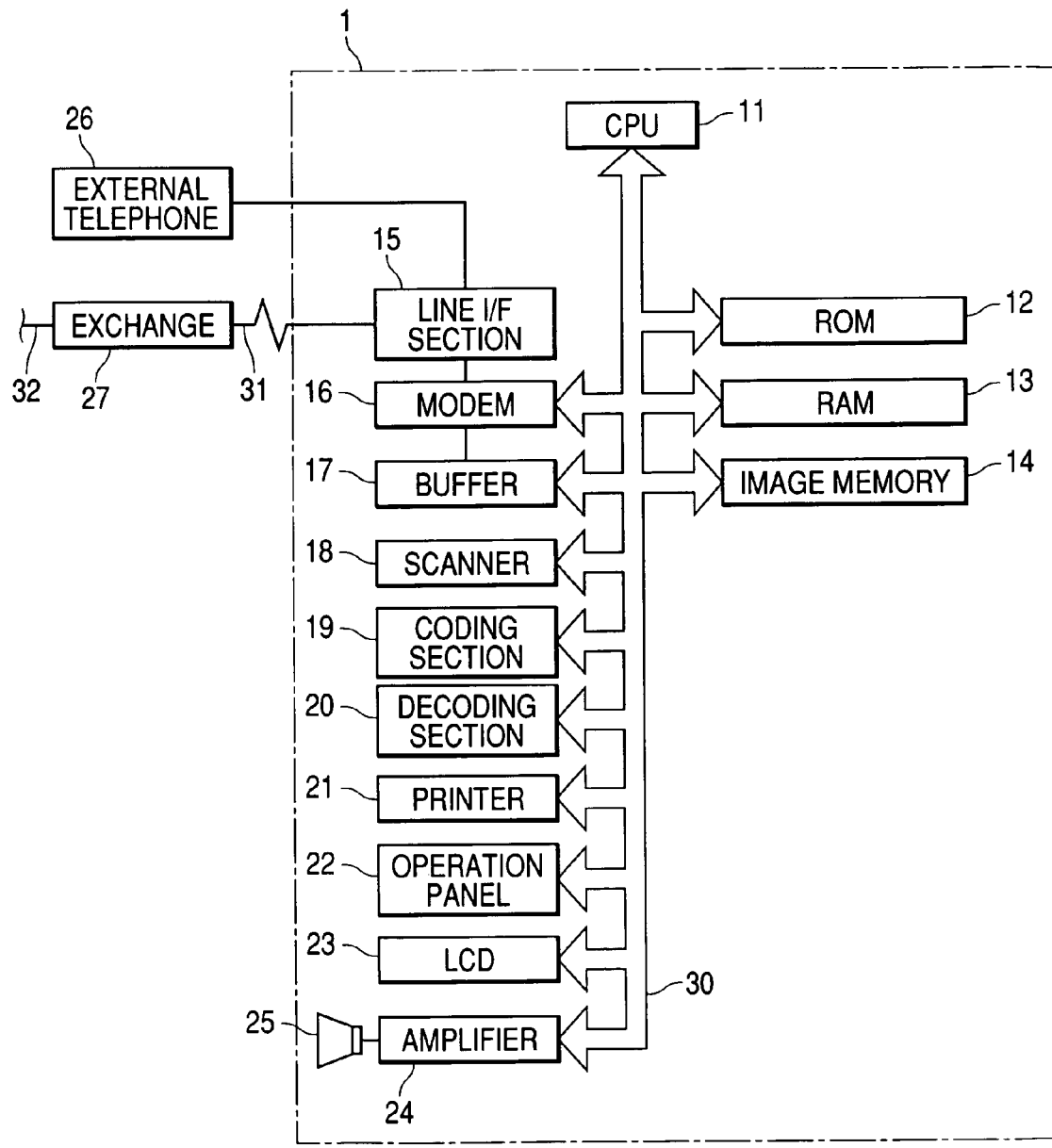
FIG. 1 is a block diagram to show the electric configuration of a facsimile apparatus in a first embodiment of the invention.

Referring now to the accompanying drawings, there are shown preferred embodiments of the invention. FIG. 1 is a block diagram to show the electric configuration of a facsimile apparatus 1 in a first embodiment of the invention. The facsimile apparatus 1 includes a CPU 11, ROM 12, RAM 13, image memory 14, a line I/F section 15, a modem 16, a buffer 17, a scanner 18, a coding section 19, a decoding section 20, a printer 21, an operation panel 22, an LCD 23, and an amplifier 24, which are connected to each other by a bus line 30.

The line I/F section 15 is provided for performing line control, and the facsimile apparatus 1 is connected through the line I/F section 15 to a telephone line 31. The line I/F section 15 receives various signals (modem signals) including tone signals such as a DTMF signal and a CNG signal, a signal indicating the telephone number of an opposite party apparatus (caller identification information (Caller ID)), and the like, and a call signal (ring signal) sent from an exchange 27, and transmits a dial signal at the calling time responsive to key operation on the operation panel 22 to the exchange 27.

The line I/F section 15 includes a semiconductor DAA 33 later described with reference to FIG. 2, and is connected to an external telephone 26 via terminals T1 and T2 (see FIG. 2).

The CPU 11 controls the sections connected by the bus line 30 in accordance with various signals transmitted and received through the line I/F section 15, and executes facsimile operation, namely, data communications. The CPU 11 contains a timer (not shown) and can count the elapsed time since a predetermined timing.

Figure 3:
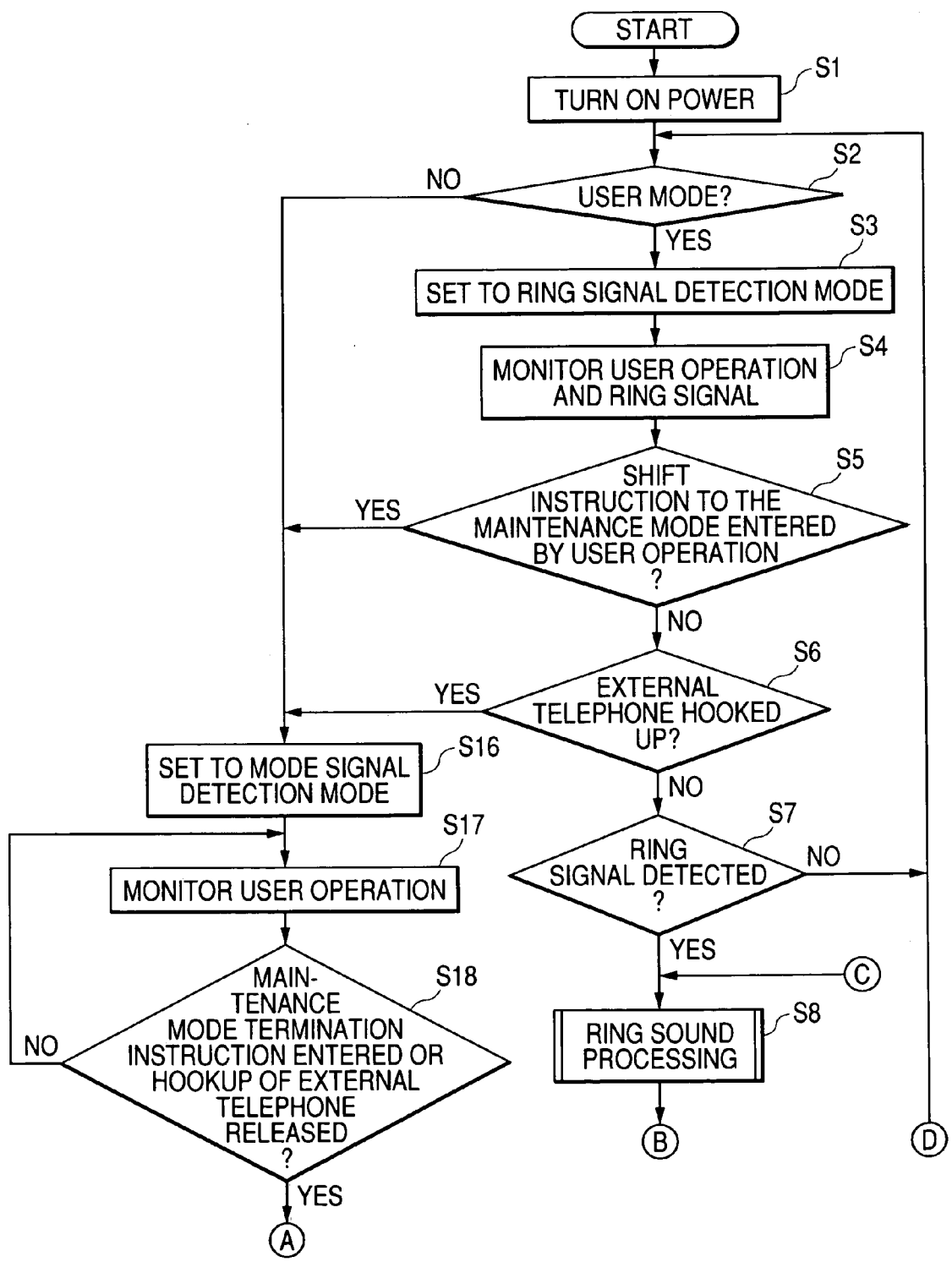
FIGS. 3 and 4 are flowcharts to show main processing in the first embodiment of the invention.
Figure 4:
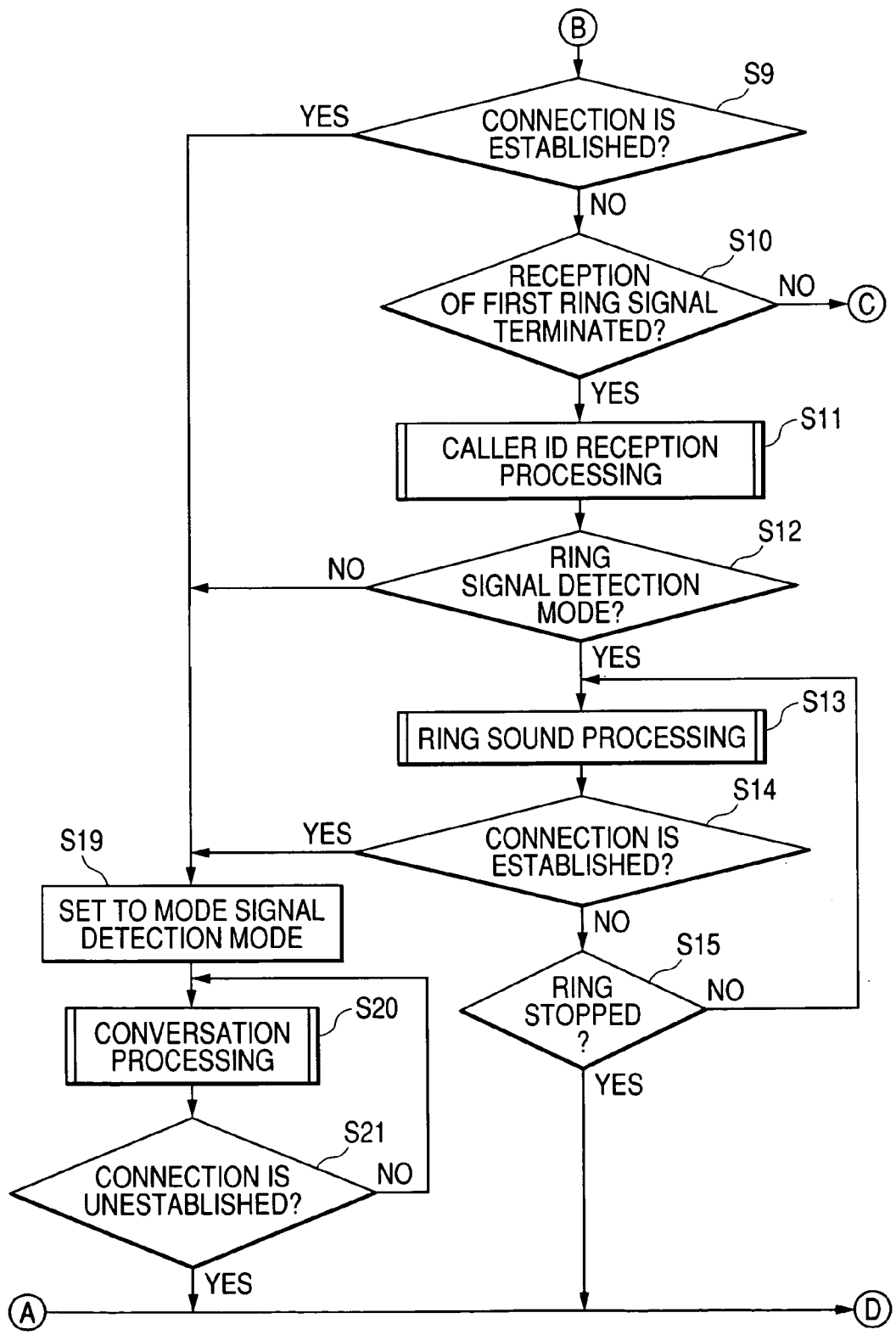
Figure 5:
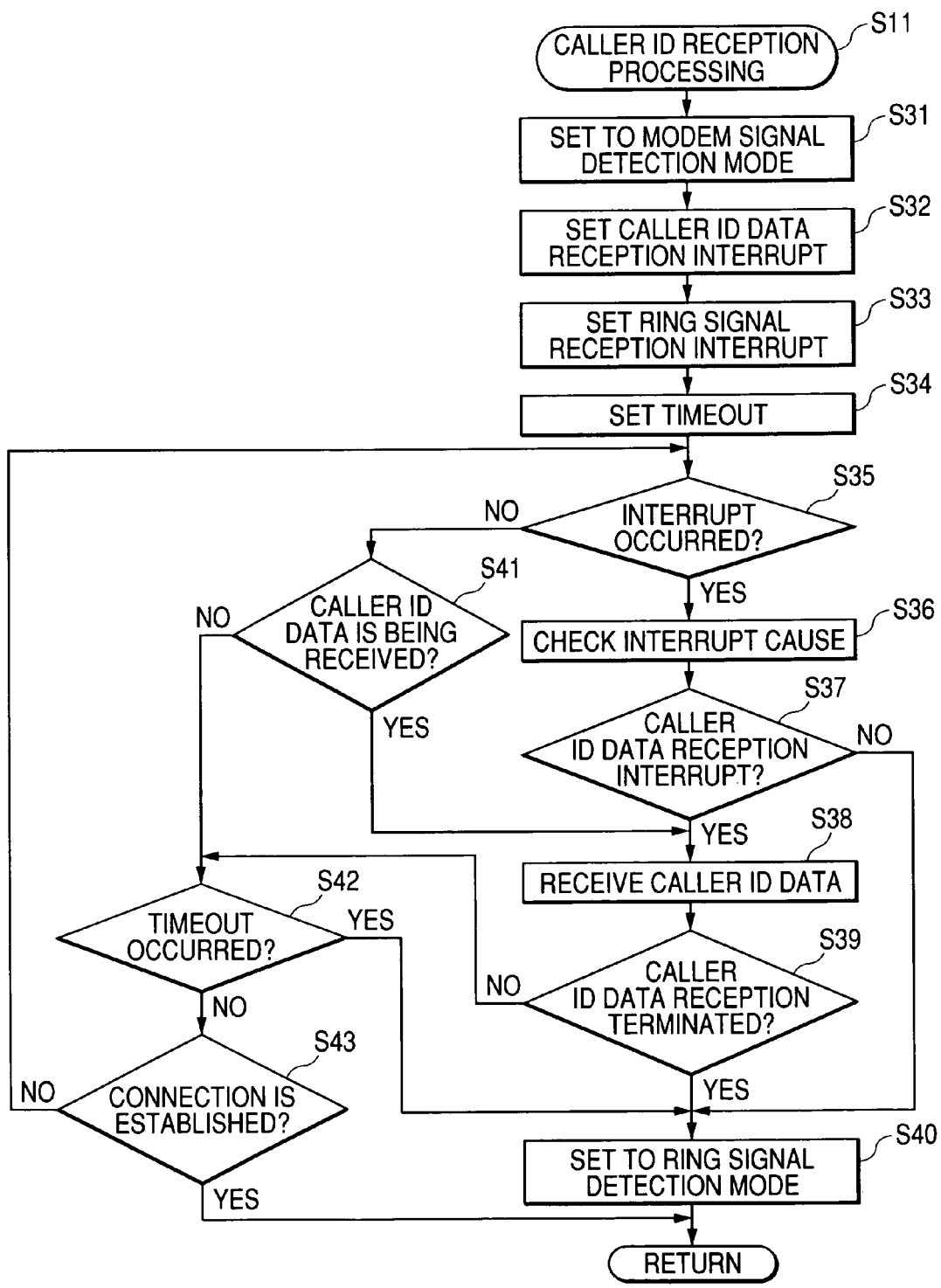
FIG. 5 is a flowchart to show Caller ID reception processing in the first embodiment of the invention.

The ROM 12 is read-only memory storing a control program, etc., executed in the facsimile apparatus 1; the program shown in flowcharts of FIGS. 3, 4 and 5 is stored in the ROM 12. The RAM 13 is memory for temporarily storing various pieces of data at the execution time of the operation of the facsimile apparatus 1.

The image memory 14 is memory for storing a communication history, image data, and a bit image for print; it is implemented as dynamic RAM (DRAM) of inexpensive large-capacity memory. Received image data is once stored in the image memory 14 and after the image data is printed on record paper on the printer 21, it is cleared from the image memory 14. The image data read through the scanner 18 is also stored in the image memory 14.

The modem 16 modulates and demodulates image information and communication data for transmission and also transmits and receives various procedure signals for transmission control. The buffer 17 temporarily stores data containing coded image information transmitted to and received from an opposite party apparatus.

The scanner 18 reads an original inserted into an original insertion slot as image data, and includes an original transport motor. The coding section 19 codes the image data read through the scanner 18. The decoding section 20 reads the image data stored in the buffer 17 or the image memory 14 and decodes the image data, and the provided data is printed on record paper on the printer 21.

The printer 21 is implemented as an ink jet printer and includes a record paper transport motor for transporting record paper, a carriage motor for moving a carriage with a print head mounted thereon, and the print head for ejecting ink onto record paper. The amplifier 24 sounds a loudspeaker 25 connected to the amplifier 24 for outputting a ring tone and voice.

The described facsimile apparatus 1 is connected to the telephone line 31 through the line I/F section 15. The telephone line 31 is connected to the exchange 27 of the facsimile apparatus 1, and the exchange 27 is connected to a different exchange via a telephone line 32. The different exchange is further connected to an opposite party apparatus via a telephone line or another apparatus as the transfer destination.

Figure 2:
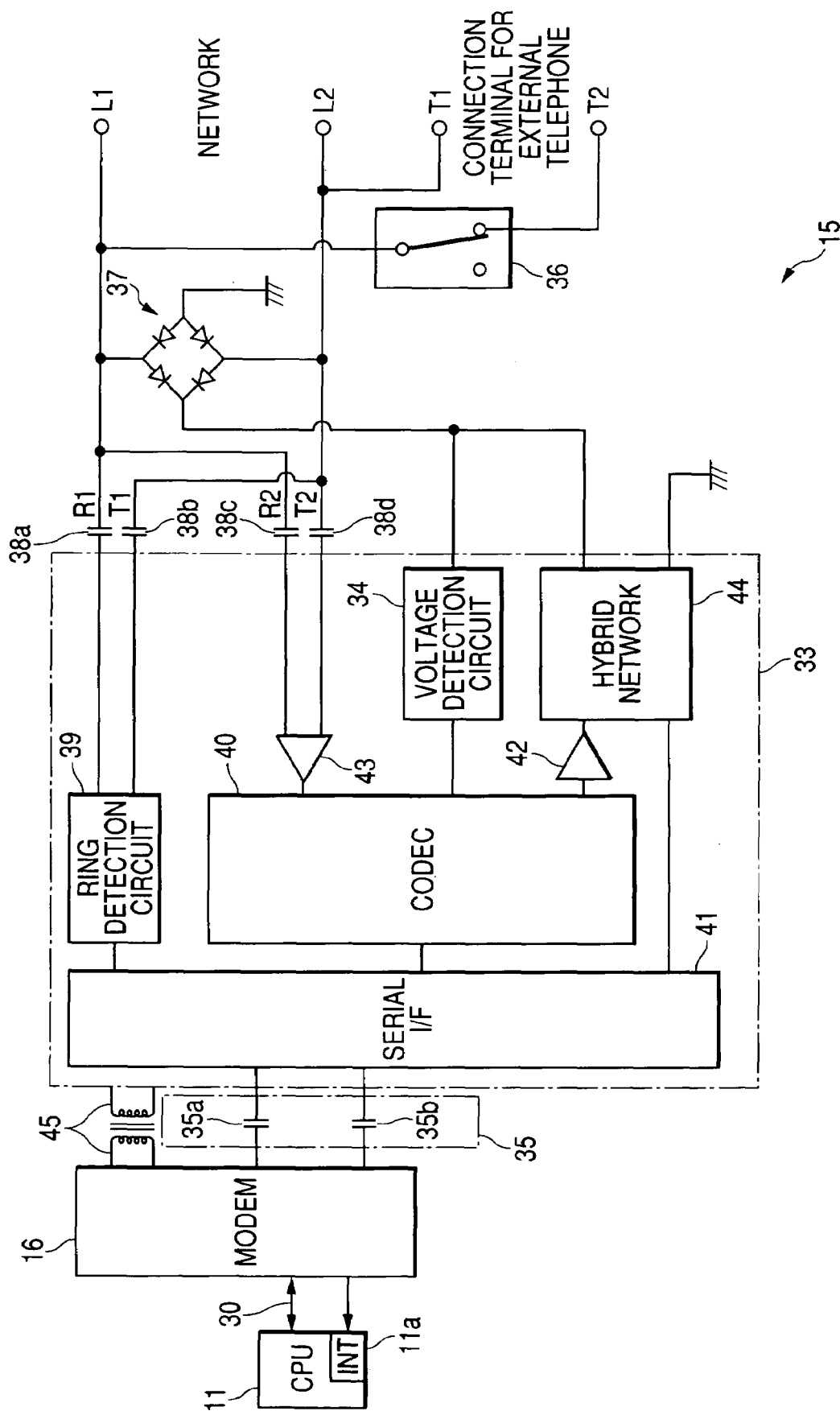
FIG. 2 is a block diagram to show the electric configuration of a line I/F section in the first embodiment of the invention.

FIG. 2 is a block diagram to show the electric configuration of the line I/F section 15 including the semiconductor DAA 33. The semiconductor DAA 33 mainly has functions of line termination, insulation from the line side, hybrid, ring detection, etc. An insulation section 35 for providing DC insulation between the semiconductor DAA 33 and the modem 16 and transmitting data, a signal, etc., intervenes between the semiconductor DAA 33 and the modem 16.

Since the semiconductor DAA 33 is provided with a CODEC 40 for performing A/D conversion and D/A conversion of FAX data as described later, the insulation section 35 becomes digital transmission. Therefore, a high-insulation capacitor generally is used as the insulation section 35.

The CPU 11 is connected to the modem 16 by the bus line 30 as described above, and is provided with an interrupt terminal 11a as shown in FIG. 2. An interrupt signal output from the semiconductor DAA 33 is input to the interrupt terminal 11a through the modem 16.

That is, when a modem signal or a ring signal comes from a network (telephone line 31) during execution of Caller ID reception processing later described with reference to FIG. 5, the semiconductor DAA 33 outputs an interrupt signal. Upon detection of the interrupt signal, the CPU 11 inquires of the modem 16 what the interrupt cause is, and switches the signal detection mode of the semiconductor DAA 33 from a modem signal detection mode into a ring signal detection mode in response to the answer from the modem 16 (interrupt cause) (see FIG. 5).

The line I/F section 15 includes a CML (Connect MODEM to Line) relay 36 for switching TEL into FAX, a rectifier 37, and DC loop cut capacitors 38a, 38b, 38c, 38d, etc., in addition to the semiconductor DAA 33. Terminals L1 and L2 are connection terminals to the network, and the terminals T1 and T2 are connection terminals to the external telephone 26 (see FIG. 1).

The CML relay 36 is set to the external telephone 26 (terminal T2) side in a standby mode as shown in FIG. 2. When FAX communications start, the CPU 11 turns off a CML relay control signal for disconnecting the network from the external telephone 26 to prevent crosstalk.

The rectifier 37 rectifies the polarity of a DC loop current of the network in one direction. Power of the semiconductor DAA 33 is supplied through a transformer 45; it is rectified by the rectifier 37 to provide voltage of constant polarity regardless of the voltage polarity of the telephone line 31.

The semiconductor DAA 33 includes a voltage detection circuit 34, a hybrid network 44, a ring detection circuit 39, the CODEC 40, and the like as shown in FIG. 2. The voltage detection circuit 34 detects the voltage value of the power rectified by the rectifier 37 and supplied to the semiconductor DAA 33, and is connected to a connection line connecting the rectifier 37 and the hybrid network 44 and the CODEC 40 as shown in FIG. 2. The detection result of the voltage detection circuit 34 is output from the semiconductor DAA 33 through the modem 16 to the CPU 11.

The hybrid network 44 establishes and cuts off a connection with the network and is made up of a two-wire to four-wire conversion circuit for separating FAX data from the telephone line 31 into transmission/reception data, a canceller circuit for suppressing routing of transmission data to a reception path, a filter circuit, and the like. The network, the CODEC 40, a serial I/F 41, and ground are connected to the hybrid network 44 as shown in FIG. 2. A transmission amplifier 42 intervenes between the hybrid network 44 and the CODEC 40.

The CODEC 40 is implemented as a modem signal detection section from the network and also performs A/D conversion and D/A conversion of FAX reception data and transmission data. The network, the external telephone 26, the voltage detection circuit 34, the hybrid network 44, and the serial I/F 41 are connected to the CODEC 40 through the transmission amplifier 42 or a tone amplifier 43 as shown in FIG. 2.

The transmission amplifier 42 is provided for making gain adjustment of transmission data. The tone amplifier 43, which is a differential amplifier, is differential input to the terminals L1 and L2 of the telephone line 31, and forms a modem signal reception section.

When a mode signal comes in the CODEC 40 from the telephone line 31 or the external telephone 26, the modem signal flows though the tone amplifier 43, the CODEC 40, the serial I/F 41, the insulation section 35, and the modem 16 in order, and the CPU 11 detects a detection signal transmitted from the CODEC 40.

The ring detection circuit 39 is a part implemented as a ring signal detection section for detecting a ring signal from the network, and is connected to the network, the external telephone 26, and the serial I/F 41 as shown in FIG. 2. When a ring signal comes in the ring detection circuit 39 from the telephone line 31, in the same cycle, a ring detection signal makes a low to high transition or a high to low transition through the ring detection circuit 39, the serial I/F 41, and a capacitor 35a of the insulation section 35, whereby the signal is detected by the CPU 11 through the modem 16.

The serial I/F 41 collects the ring detection signal from the ring detection circuit 39, the FAX reception data from the CODEC 40, etc., into serial data for a capacitor 35b of the insulation section 35 and on the other hand, separates a serial signal from the capacitor 35a of the insulation section 35 into a control signal for causing the semiconductor DAA 33 to establish and cut off a connection with the network and FAX transmission data to the CODEC 40.

Next, processing executed in the described facsimile apparatus 1 will be discussed with reference to flowcharts of FIGS. 3, 4 and 5 and also with reference to FIG. 6 whenever necessary.

FIG. 6 is a drawing to show a switch table of the signal detection mode (modem signal detection mode, ring signal detection mode) of the semiconductor DAA 33; it shows the signal detection mode in each combination of the line state of the telephone line 31 (connection unestablished 71 or connection established 72) and operation state 61 to 66 of the facsimile apparatus 1.

According to FIG. 6, for example, when the connection is unestablished 71, if the operation state is determined to be user mode standby 61, the signal detection mode is switched into the "ring signal detection mode," if the operation state is determined to be maintenance mode 62, the signal detection mode is switched into the "modem signal detection mode."

The "user mode" refers to a usual use state of the user and a state in which a connection through the line is unestablished and neither conversation nor FAX transmission/reception is conducted.

FIGS. 3 and 4 are flowcharts to show main processing executed in the facsimile apparatus 1. The main processing is processing repeatedly executed by the CPU 11 while the power of the facsimile apparatus 1 is turned on, wherein the operation state 61 to 66 of the facsimile apparatus 1 (see FIG. 6) is determined and the signal detection mode of the semiconductor DAA 33 is switched into the modem signal detection mode or the ring signal detection mode in response to the determination result for reliably detecting both a modem signal (for example, Caller ID data) and a ring signal.

When the power of the facsimile apparatus 1 is turned on (S1), the CPU 11 first checks whether or not the operation state of the facsimile apparatus 1 is "user mode standby 61 (see FIG. 6)". If it is determined that the operation state of the facsimile apparatus 1 is the user mode standby 61 (Yes at S2), it means that the facsimile apparatus 1 is to receive a ring signal transmitted from the exchange 27 unless a connection through the telephone line 31 is established, and thus the signal detection mode of the semiconductor DAA 33 is set to (switched into) the ring signal detection mode (S3) and user operation and detection of a ring signal are monitored (S4). Accordingly, if a ring signal is transmitted from the exchange 27, the ring signal can be reliably detected and a ring tone can be produced in real time in response to the ring signal from the exchange 27.

Whether or not a shift instruction to the maintenance mode is entered by user operation is checked (S5). If it is not determined that a shift instruction to the maintenance mode is entered (No at S5), further whether or not the external telephone 26 is hooked up is checked (S6). If it is not determined that the external telephone 26 is hooked up (No at S6), it means that the facsimile apparatus 1 is still to receive a ring signal, and the signal detection mode of the semiconductor DAA 33 need not be switched into the modem signal detection mode (see FIG. 6).

Thus, in this case (No at S6), whether or not a ring signal is detected is checked (S7). If it is determined that a ring signal is not yet detected (No at S7), the process goes to S2 for monitoring user operation and detection of a ring signal with the signal detection mode of the semiconductor DAA 33 held in the ring signal detection mode.

On the other hand, if it is determined that a ring signal is detected (Yes at S7), it means that the first ring signal coming from the exchange 27 is detected. Thus, in this case (Yes at S7), ring sound processing (S8) is executed to produce a ring tone in response to the first ring signal. Whether or not a connection through the telephone line 31 is established in response to sounding the ring tone is checked (S9).

If it is determined that a connection through the telephone line 31 is not established, namely, the connection unestablished state is maintained (No at S9), then whether or not reception of the first ring signal terminates is checked (S10). If it is not determined that reception of the first ring signal terminates (No at S10), the process goes to S8 to continue producing the ring tone and monitoring the line state of the telephone line 31.

On the other hand, if it is determined that reception of the first ring signal terminates (Yes at S10), Caller ID reception processing (S11) is executed. Here, the Caller ID reception processing (S11) will be discussed with reference to a flowchart of FIG. 5. FIG. 5 is a flowchart to show the Caller ID reception processing. The Caller ID reception processing is processing for receiving Caller ID data (caller identification information data) transmitted from the exchange 27 between the first and second ring signals.

If reception of the first ring signal terminates (Yes at S10; see FIG. 4), it means that the facsimile apparatus 1 is to receive a modem signal (see FIG. 6). Thus, in the Caller ID reception processing (S11) shown in FIG. 5, first the signal detection mode of the semiconductor DAA 33 is once set to (switched into) the modem signal detection mode (S31) to receive Caller ID data. Then, a Caller ID data reception interrupt is set (S32) and a ring signal reception interrupt is set (S33) and further a timeout is set (S34). In the embodiment, the timeout is set to 4 seconds.

After they are set at S31 to S34, whether or not an interrupt occurs is checked (S35). If it is determined that an interrupt occurs (Yes at S35), the cause of the interrupt is checked (S36).

When a modem signal or a ring signal comes from the telephone line 31, the semiconductor DAA 33 outputs an interrupt signal and this interrupt signal is input to the interrupt terminal 11a of the CPU 11 through the modem 16, thus enabling the CPU 11 to detect occurrence of an interrupt (S35). If the CPU 11 detects occurrence of an interrupt (Yes at S35), the CPU 11 can inquire of the modem 16 what the interrupt cause is, thereby checking whether the interrupt cause is a Caller ID data reception interrupt or a ring signal reception interrupt (S36).

If the interrupt cause is determined to be a Caller ID data reception interrupt (Yes at S37) as a result of checking the interrupt cause at S36, it means that the facsimile apparatus 1 is to detect a modem signal. However, the signal detection mode of the semiconductor DAA 33 is already switched into the modem signal detection mode at S31 and thus Caller ID data reception processing is started (S38) as in the state.

After the Caller ID data reception processing is started at S38, whether or not the Caller ID data reception terminates is checked (S39). If it is determined that the Caller ID data reception terminates (Yes at S39), it means that the facsimile apparatus 1 is to receive the second ring signal (see FIG. 6), and thus the signal detection mode of the semiconductor DAA 33 is set to (switched into) the ring signal detection mode from the modem signal detection mode (S40) and the Caller ID data reception processing is terminated to detect the second ring signal.

On the other hand, if the interrupt cause is not determined to be a Caller ID data reception interrupt (No at S37), it means that a ring signal reception interrupt occurs, namely, the facsimile apparatus 1 is to detect the second ring signal (see FIG. 6). Thus, to detect the second ring signal, S38 and S39 are skipped and then the signal detection mode of the semiconductor DAA 33 is switched into the ring signal detection mode from the modem signal detection mode (S40).

Thus, according to the facsimile apparatus 1, when reception of the first ring signal terminates (Yes at S10), the signal detection mode of the semiconductor DAA 33 is once set to the modem signal detection mode (S31) and a Caller ID data reception interrupt and a ring signal reception interrupt are set (S32 and S33). If a Caller ID data reception interrupt occurs (Yes at S37), Caller ID data is received as in the state; if a ring signal reception interrupt occurs (No at S37), the signal detection mode of the semiconductor DAA 33 can be switched into the ring signal detection mode (S40), so that missing the second ring signal can be prevented.

If it is not determined that an interrupt occurs (No at S35), whether or not Caller ID data is being received is checked (S41). If it is determined that Caller ID data is being received, namely, if a Caller ID reception interrupt already occurs and Caller ID data is being received (Yes at S41), the process goes to S38 to continue reception processing of the Caller ID data.

On the other hand, if it is not determined that Caller ID data is being received, namely, if it is determined that a Caller ID data reception interrupt or a ring signal reception interrupt does not yet occur (No at S41), then whether or not a timeout occurs, namely, whether or not a state in which Caller ID data cannot be detected has continued a predetermined time (4 seconds) or more is checked (S42). If it is determined that the Caller ID data reception does not yet terminate (No at S39), whether or not a timeout occurs, namely, whether or not the Caller ID data reception processing has been performed for a predetermined time (4 seconds) or more is also checked (S42).

If it is determined that a timeout occurs (Yes at S42), it means that the signal coming from the exchange 27 does not contain Caller ID data or that although Caller ID data is contained, a reception failure, etc., occurs for some reason and reception of the Caller ID data is not completed within the predetermined time. Thus, in this case (Yes at S42), it means that the facsimile apparatus 1 is to detect the second ring signal (see FIG. 6), and thus to detect the second ring signal, the signal detection mode of the semiconductor DAA 33 is switched into the ring signal detection mode from the modem signal detection mode (S40) and the Caller ID data reception processing is exited.

On the other hand, if it is determined that a timeout does not yet occur (No at S42), then whether or not a connection through the telephone line 31 is established is checked (S43). If it is determined that a connection through the telephone line 31 is not established, namely, the connection unestablished state is maintained (No at S43), the process goes to S35 to monitor occurrence of an interrupt or continue receiving Caller ID data.

On the other hand, if it is determined that the connection through the telephone line 31 is established (Yes at S43), it means that the facsimile apparatus 1 needs to detect a modem signal to execute conversation processing. Thus, the Caller ID reception processing is exited with the signal detection mode of the semiconductor DAA 33 held in the modem signal detection mode.

Referring again to the flowchart of FIG. 4, after the Caller ID reception processing (S11) is executed, whether or not the current detection mode is the ring signal detection mode is checked (S12). If it is determined that the current detection mode is the ring signal detection mode (Yes at S12), it means that the Caller ID data reception terminates (Yes at S39), that a timeout occurs (Yes at S42), or that a ring signal reception interrupt occurs (No at S37) in the Caller ID reception processing (S11) described above. Thus, ring sound processing (S13) is executed to produce a ring tone in response to the second ring signal (see FIG. 6), and whether or not a connection through the telephone line 31 is established in response to sounding the ring tone is checked (S14).

If it is determined that the connection through the telephone line 31 is not established, namely, the connection unestablished state is maintained (No at S14), then whether or not transmission of the second ring signal from the exchange 27 stops is checked (S15). If it is not determined that transmission of the second ring signal stops (No at S15), the process goes to S13 to continue producing the ring tone and monitoring the line state of the telephone line 31. Whether or not transmission of the second ring signal stops is determined by whether or not the off state of the ring signal has been detected for a predetermined time or more.

If it is not determined that the operation state of the facsimile apparatus 1 is the "user mode standby 61 (see FIG. 6)" (No at S2) or if it is determined that a shift instruction to the maintenance mode is entered by user operation (Yes at S5) or if it is determined that the external telephone 26 is hooked up (Yes at S6), it means that the facsimile apparatus 1 is to detect a modem signal with an operation state shift made to "maintenance mode 62 (see FIG. 6)" or "external telephone hookup 63 (see FIG. 6)."

Thus, in this case (No at S2, Yes at S5, or Yes at S6), the signal detection mode of the semiconductor DAA 33 is set to (switched into) the modem signal detection mode (S16) to detect a modem signal. Detection of user operation is monitored (S17) and whether or not a termination instruction of the maintenance mode is entered or hookup of the external telephone 26 is released is checked (S18). If it is determined that a termination instruction is not yet entered and hookup is not yet released (No at S18), the process goes to S17 to continue monitoring detection of user operation.

At S9 or S14, namely, when a ring tone is produced in response to the first or second ring signal, if it is determined that a connection through the telephone line 31 is established (Yes at S9 or Yes at S14), or if it is determined at S12 that the signal detection mode is not the ring signal detection mode, namely, it is determined that the connection through the telephone line 31 is established in the Caller ID reception processing (S11) (No at S12), it means that the facsimile apparatus 1 is to detect a modem signal (see FIG. 6), and thus the signal detection mode of the semiconductor DAA 33 is set to (switched into) the modem signal detection mode (S19), conversation processing (S20) is executed, and whether or not a connection through the telephone line 31 is unestablished is checked (S21). If it is determined that the connection established state is maintained (No at S21), the process goes to S20 and the conversation processing (S20) is continued.

If it is determined that transmission of the second ring signal stops (Yes at S15) or if it is determined that a termination instruction is entered or hookup is released (Yes at S18) or if it is determined that a connection through the telephone line 31 is unestablished (Yes at S21), the process goes to S2 and the above-described processing is repeatedly executed. Accordingly, the operation state 61 to 66 of the facsimile apparatus 1 (see FIG. 6) is determined and the signal detection mode of the semiconductor DAA 33 can be switched into the modem signal detection mode or the ring signal detection mode in response to the determination result, so that both a modem signal and a ring signal can be detected reliably.

Next, a second embodiment of the invention will be discussed with reference to FIGS. 7 to 10. In the facsimile apparatus 1 of the first embodiment, when the first ring signal terminates, the signal detection mode of the semiconductor DAA 33 is switched into the modem signal detection mode; while in a facsimile apparatus 1 of the second embodiment, if an information terminal start signal (CAR signal) is detected, the signal detection mode of a semiconductor DAA 33 is switched into a modem signal detection mode.

Parts identical with those of the first embodiment previously described with reference to FIGS. 1 to 6 are denoted by the same reference numerals and will not be discussed again. Processing will be discussed with reference to flowcharts of FIGS. 7 and 9 and also with reference to FIG. 10 whenever necessary as with the first embodiment.

Figure 7:
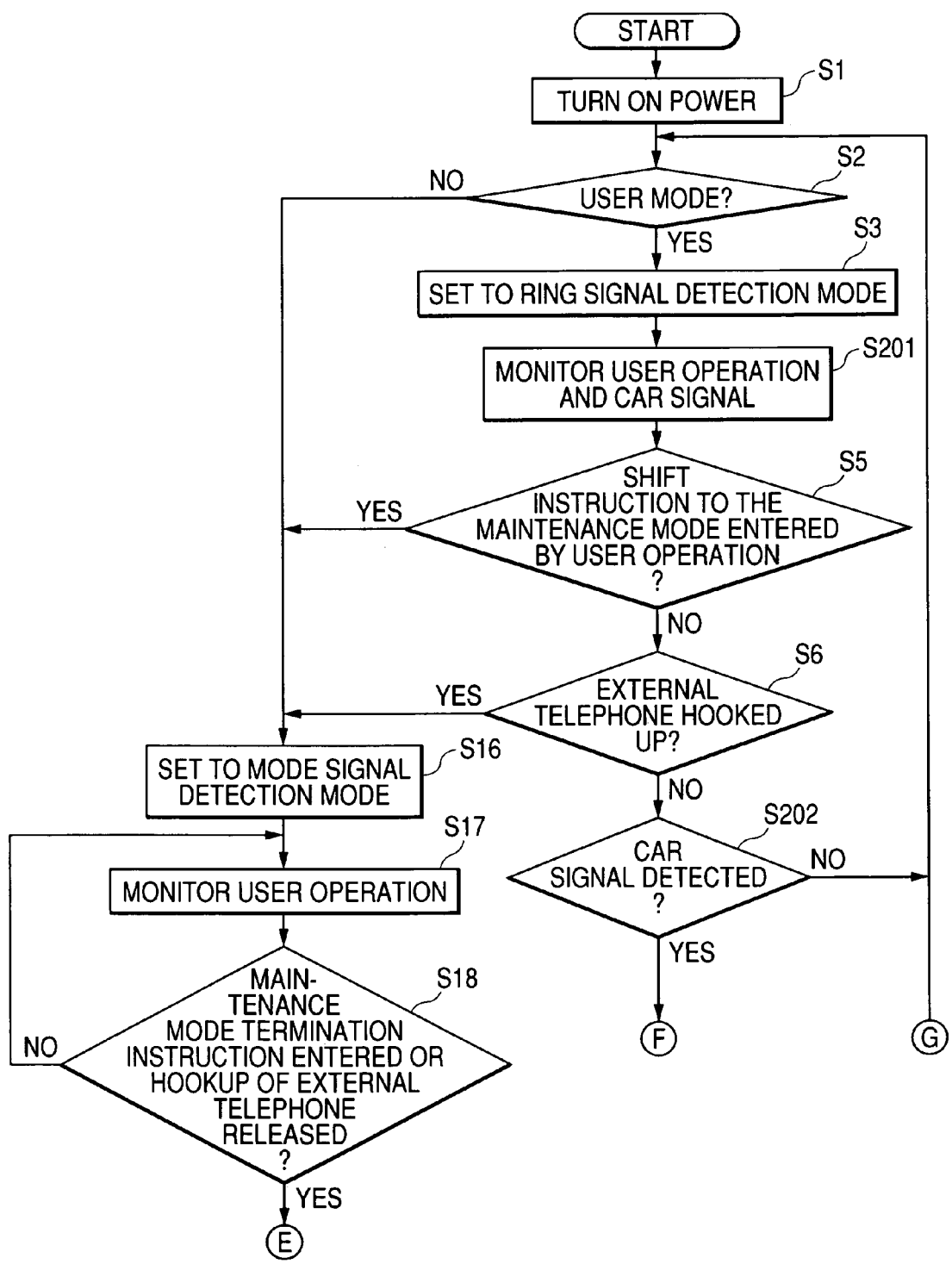
FIGS. 7 and 8 are flowcharts to show main processing in a second embodiment of the invention.
Figure 8:
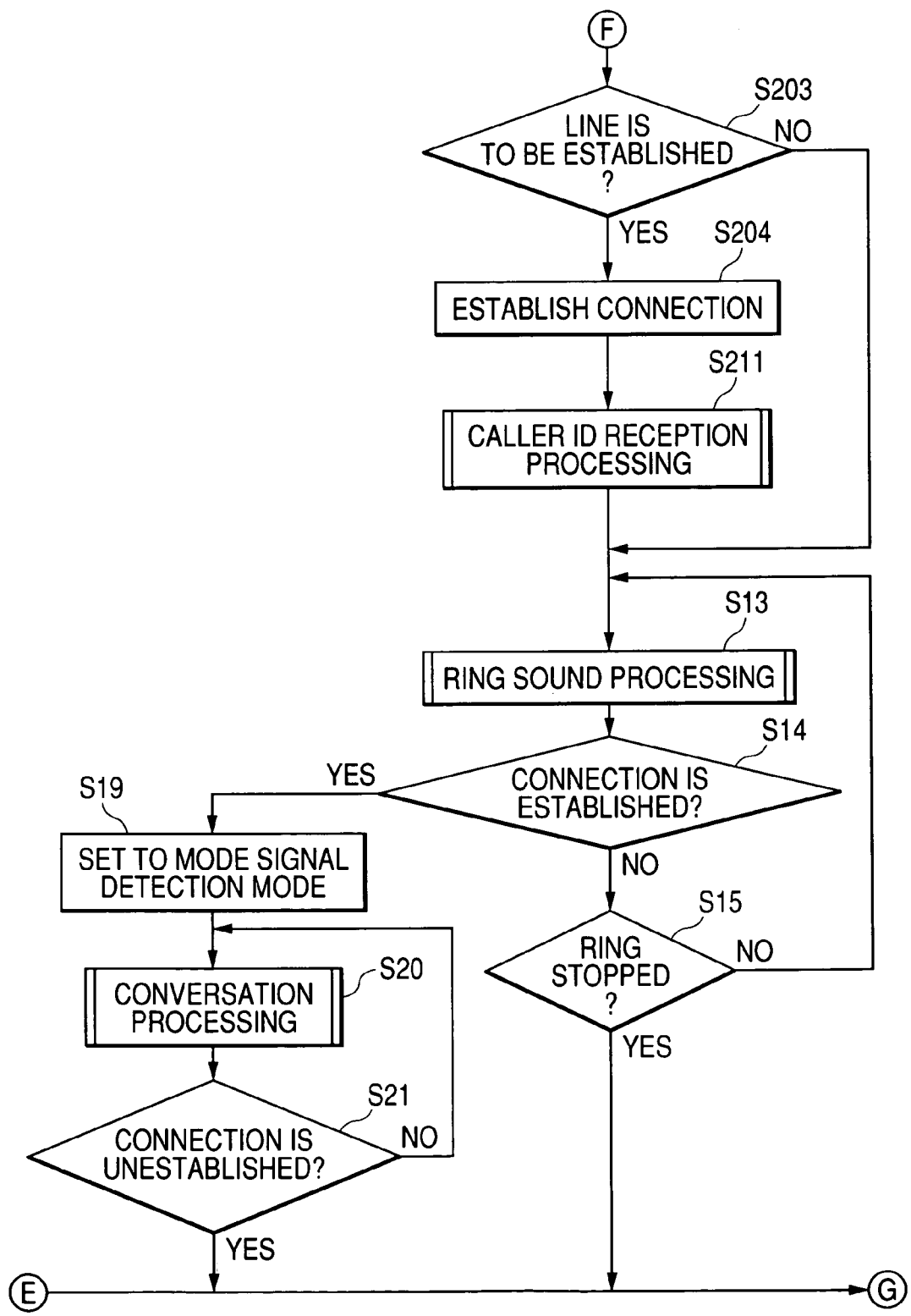

FIGS. 7 and 8 are flowcharts to show main processing executed in the facsimile apparatus 1 of the second embodiment. The main processing is processing repeatedly executed by a CPU 11 while the power of the facsimile apparatus 1 is turned on, wherein the operation state 61 to 63, 264 to 266 of the facsimile apparatus 1 (see FIG. 10) is determined and the signal detection mode of the semiconductor DAA 33 is switched into the modem signal detection mode or a ring signal detection mode in response to the determination result for reliably detecting both a modem signal (for example, Caller ID data) and a ring signal as with the first embodiment.

In the second embodiment, to switch the signal detection mode of the semiconductor DAA 33 into the modem signal detection mode upon reception of a CAR signal transmitted from an exchange 27, the CPU 11 monitors user operation and a CAR signal (S201) as shown in the flowchart of FIG. 7. The CAR signal is detected by a ring detection circuit 39 of the semiconductor DAA 33 in the ring signal detection mode. However, detection section for detecting the CAR signal may be provided separately from the ring detection circuit 39.

If it is not determined that a shift instruction to a maintenance mode is entered (No at S5) and if it is not determined that an external telephone 26 is hooked up (No at S6), whether or not an information terminal start signal (CAR signal) is detected is checked (S202). If it is not determined that a CAR signal is detected (No at S202), the process goes to S2 for continuing monitoring user operation and detection of a CAR signal with the signal detection mode of the semiconductor DAA 33 held in the ring signal detection mode.

If a CAR signal from the exchange 27 is detected and consequently the facsimile apparatus 1 cuts off the connection through the telephone line 31, the exchange 27 determines that the facsimile apparatus 1 can receive and desires to receive Caller ID data, and transmits Caller ID data to the facsimile apparatus 1. On the other hand, if the facsimile apparatus 1 does not cut off the connection through the telephone line 31 although a predetermined number of CAR signals (six CAR signals) have been transmitted, the exchange 27 determines that the facsimile apparatus 1 cannot receive or does not desire to receive Caller ID data, and starts to transmit a ring signal without transmitting Caller ID data to the facsimile apparatus 1.

Thus, if a CAR signal is detected (Yes at S202), the CPU 11 determines whether or not a connection through the telephone line 31 is to be established (S203). If it is determined that the connection through the telephone line 31 needs to be established, namely, Caller ID data needs to be received (Yes at S203), the connection through the telephone line 31 is established to request the exchange 27 to transmit Caller ID data (S204). The connection through the telephone line 31 is established when the CPU 11 recognizes at least one CAR signal, namely, regardless of whether all of the predetermined number of CAR signals (six CAR signals) have been received.

Figure 9:
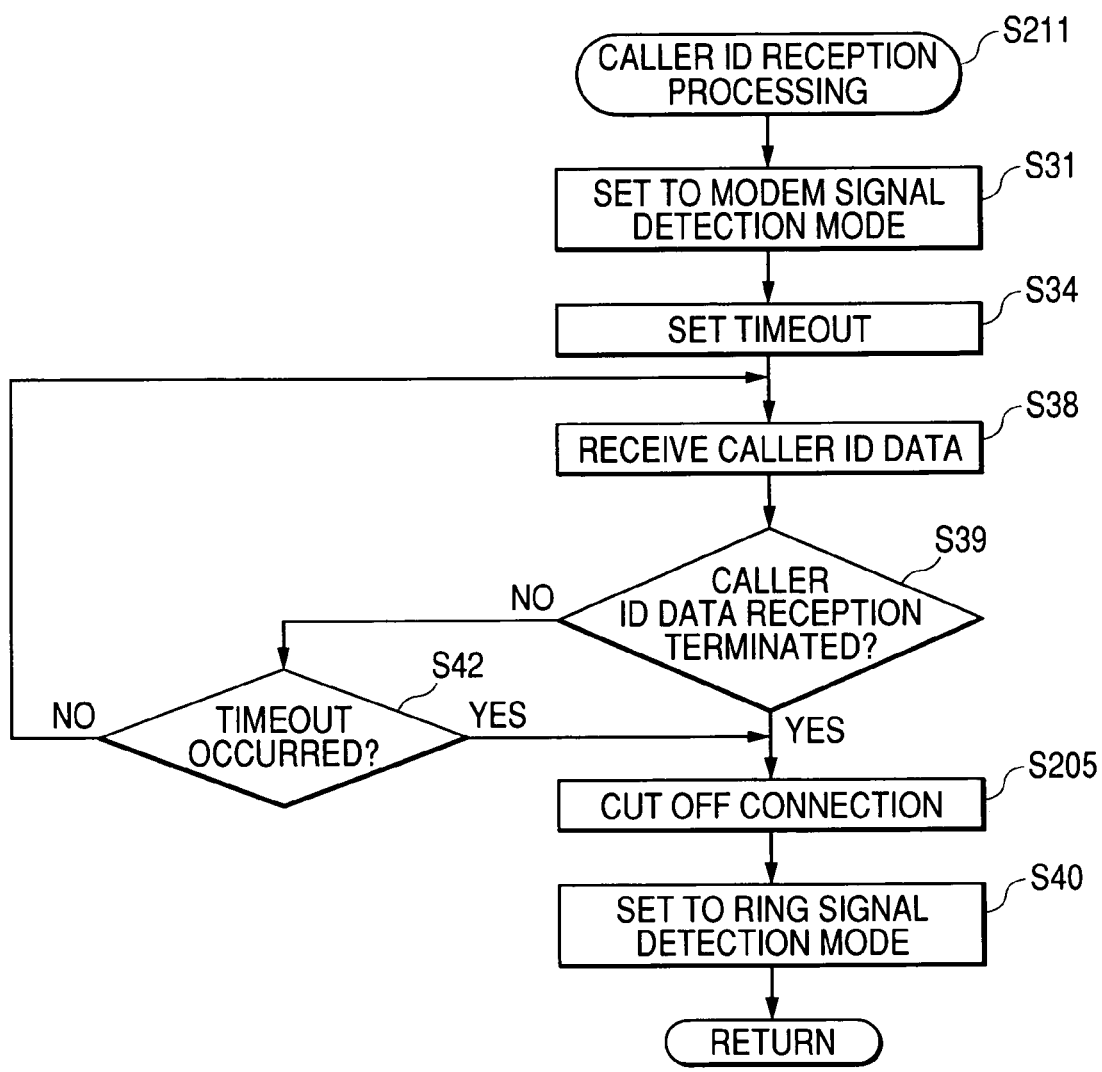
FIG. 9 is a flowchart to show Caller ID reception processing in the second embodiment of the invention.
Figure 10:
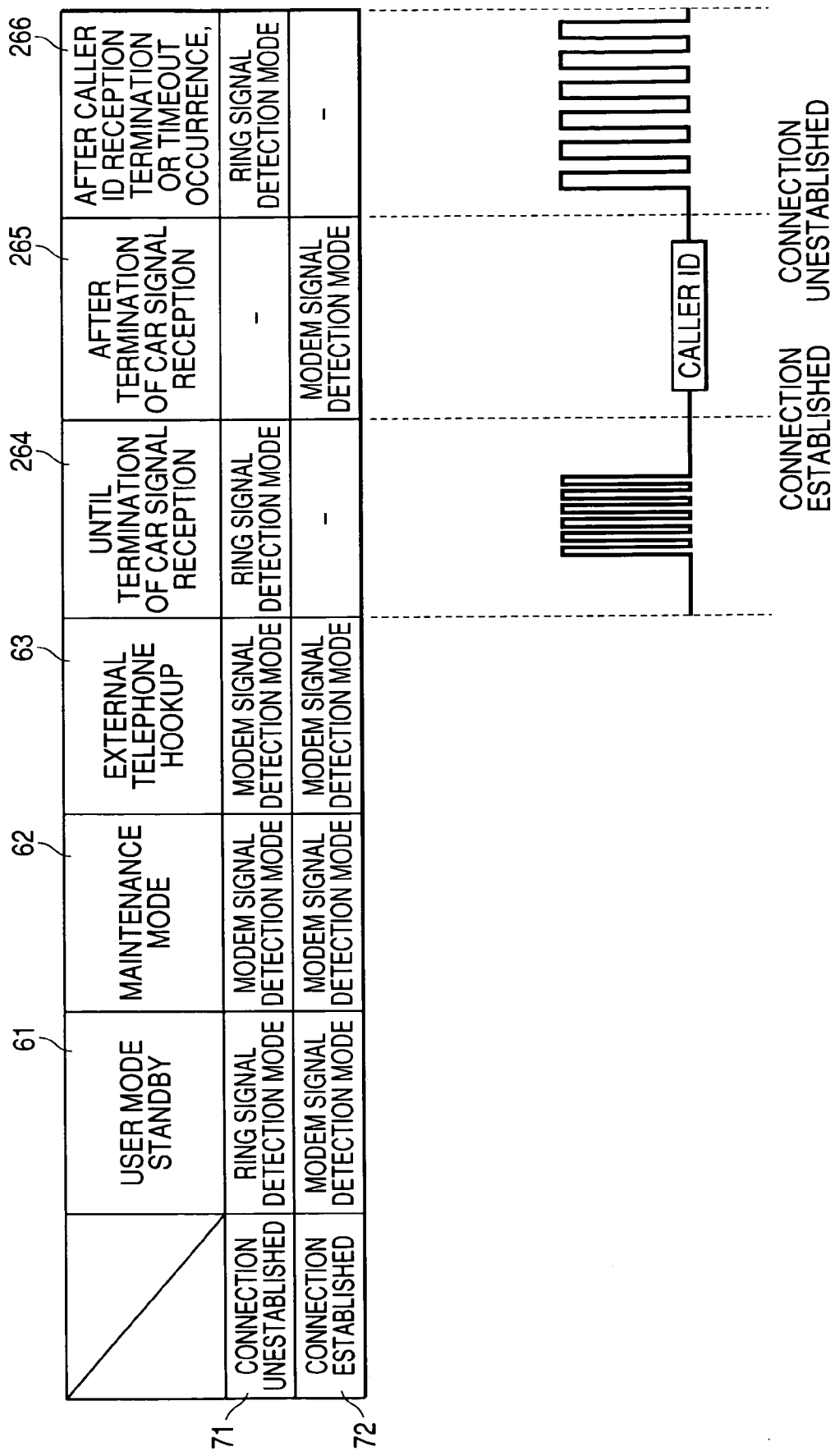
FIG. 10 is a drawing to show a switch table of a detection mode of a semiconductor DAA in the second embodiment of the invention.

When a connection through the telephone line 31 is established, the exchange 27 determines that a Caller ID data transmission request has been received from the facsimile apparatus 1, and starts to transmit Caller ID data (see FIG. 10). Then, the CPU 11 executes Caller ID reception processing (S211) to receive the Caller ID data. Here, the Caller ID reception processing (S211) will be discussed with reference to a flowchart of FIG. 9.

FIG. 9 is a flowchart to show the Caller ID reception processing. The Caller ID reception processing is processing for receiving Caller ID data (see FIG. 10) transmitted from the exchange 27 between a CAR signal and a ring signal.

In the Caller ID reception processing (S211), first the signal detection mode of the semiconductor DAA 33 is set to (switched into) the modem signal detection mode (S31) to receive Caller ID data. After a timeout is set (S34), Caller ID data reception processing is executed (S38).

Then, while whether or not a predetermined time has elapsed since the reception processing was started (timeout has occurred) is checked (S42) and whether or not the Caller ID data reception terminates is checked (S39), the Caller ID data reception processing is continued (S38). If it is determined that the Caller ID data reception terminates (Yes at S39) or if timeout has occurred (Yes at S42), a connection through the telephone line 31 is unestablished (S205) to request the exchange 27 to transmit a ring signal.

When a connection through the telephone line 31 is unestablished, the exchange 27 determines that the facsimile apparatus 1 terminates reception of the Caller ID data and then makes a request for transmitting a ring signal, and starts to transmit a ring signal (see FIG. 10). Then, the CPU 11 sets (switches) the signal detection mode of the semiconductor DAA 33 to (into) the ring signal detection mode (S40) to receive the ring signal, and exits the Caller ID reception processing (S211).

In the second embodiment, a connection through the line is unestablished when reception of the Caller ID data terminates as described above, namely, a connection through the line is established during reception of the Caller ID data and therefore meanwhile the exchange 27 does not transmit a ring signal. Thus, unlike the first embodiment, an interrupt need not be set for checking whether or not a ring signal reception interrupt occurs.

Referring again to the flowchart of FIG. 8, after the Caller ID reception processing (S211) is executed, a ring signal is transmitted from the exchange 27 as described above and thus ring sound processing (S13) is executed to produce a ring tone in response to the ring signal.

If it is determined at S203 that a connection through the telephone line 31 need not be established, namely, Caller ID data need not be received (for example, the user sets non-use of number display function) (No at S203), the connection through the telephone line 31 is not established. Therefore, the exchange 27 starts to transmit a ring signal without transmitting Caller ID data and thus ring sound processing (S13) is executed to produce a ring tone in response to the ring signal, as described above.

Thus, according to the facsimile apparatus 1 in the second embodiment, if a CAR signal is detected and it is determined that a modem signal is to be detected, the signal detection mode of the semiconductor DAA can be switched into the modem signal detection mode, so that the Caller ID data transmitted from the exchange 27 can be detected reliably.

Next, a third embodiment of the invention will be discussed with reference to FIGS. 11 to 14. In the facsimile apparatus 1 of the first embodiment, when the first ring signal terminates, the signal detection mode of the semiconductor DAA 33 is switched into the modem signal detection mode; while in a facsimile apparatus 1 of the third embodiment, if inversion is detected, the signal detection mode of a semiconductor DAA 33 is switched into a modem signal detection mode.

Parts identical with those of the first embodiment previously described with reference to FIGS. 1 to 6 are denoted by the same reference numerals and will not be discussed again. Processing will be discussed with reference to flowcharts of FIGS. 11, 12 and 13 and also with reference to FIG. 14 whenever necessary as with the first embodiment.

Figure 11:
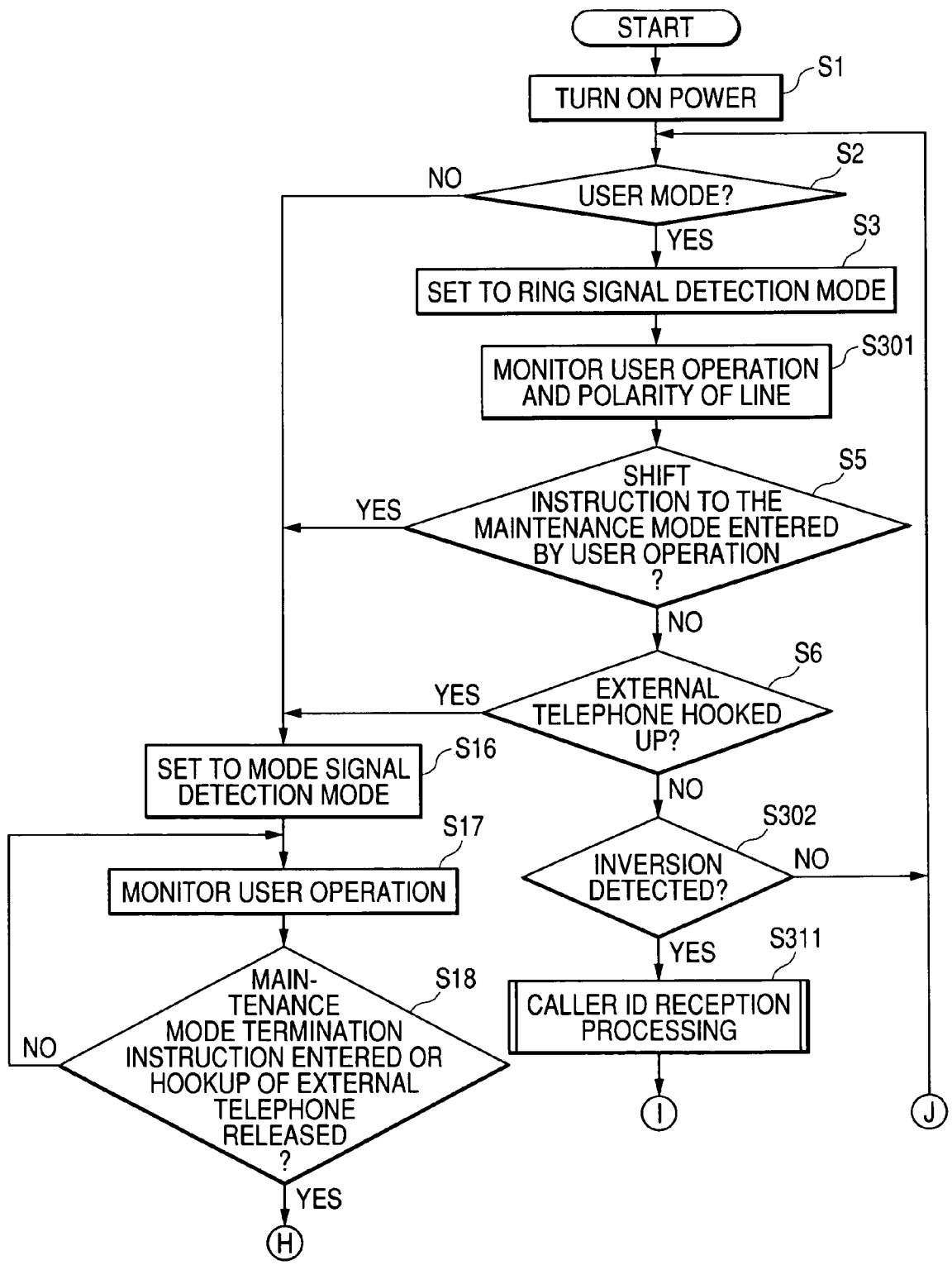
FIGS. 11 and 12 are flowcharts to show main processing in a third embodiment of the invention.
Figure 12:
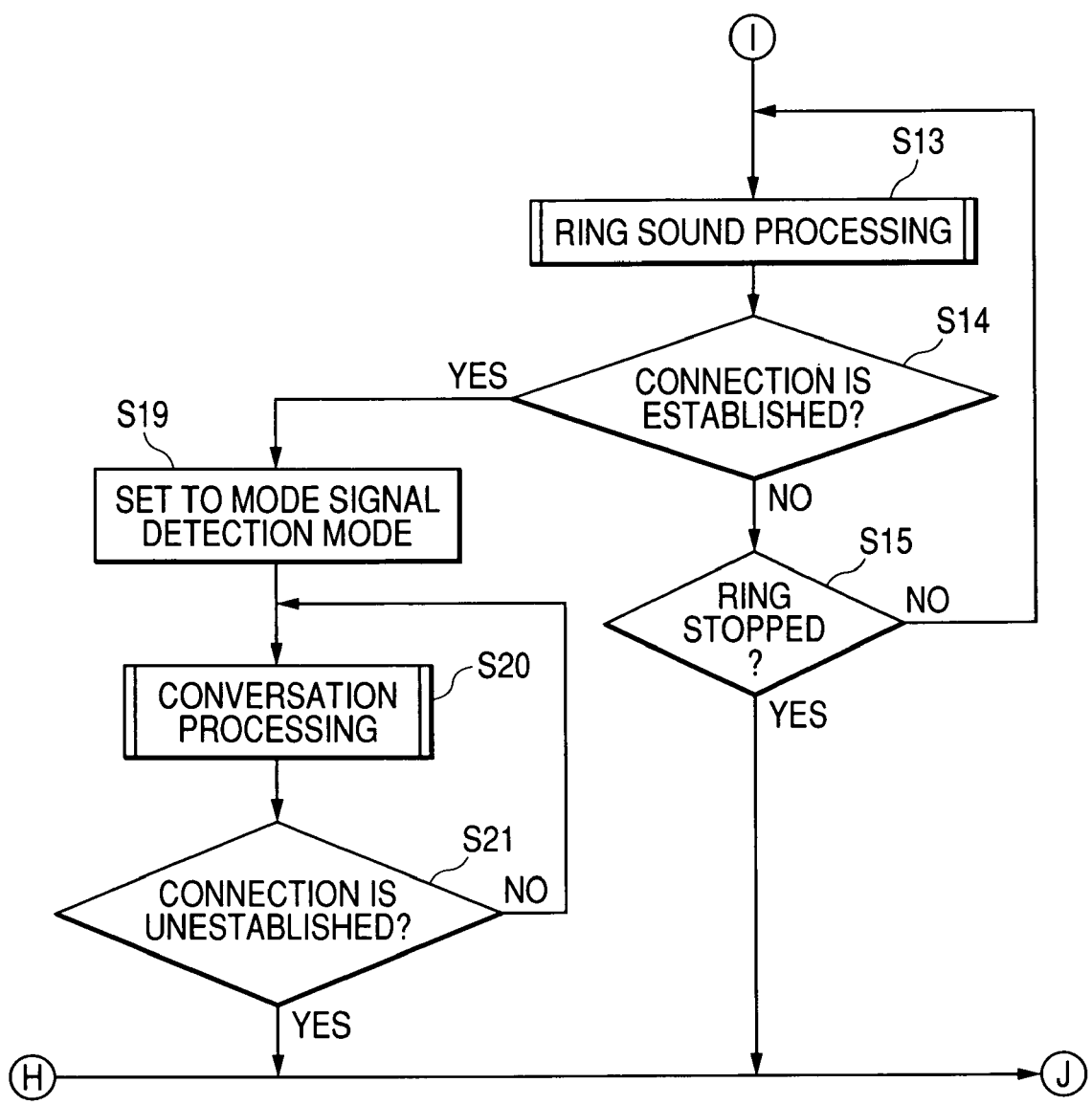

FIGS. 11 and 12 are flowcharts to show main processing executed in the facsimile apparatus 1 of the third embodiment. The main processing is processing repeatedly executed by a CPU 11 while the power of the facsimile apparatus 1 is turned on, wherein the operation state 61 to 63, 66, 364, 365 of the facsimile apparatus 1 (see FIG. 14) is determined and the signal detection mode of the semiconductor DAA 33 is switched into the modem signal detection mode or a ring signal detection mode in response to the determination result for reliably detecting both a modem signal (for example, Caller ID data) and a ring signal as with the first embodiment.

In the third embodiment, if the polarity of the telephone line 31 is inverted by an exchange 27 (see FIG. 1), the signal detection mode of the semiconductor DAA 33 is switched into the modem signal detection mode and thus the CPU 11 monitors user operation and the polarity of the telephone line 31 (S301) as shown in the flowchart of FIG. 11.

A ring detection circuit 39 of the semiconductor DAA 33 (see FIG. 2) is provided with a polarity inversion detection circuit (not shown) for detecting whether or not the polarity of the telephone line 31 is inverted in the ring signal detection mode. However, the polarity inversion detection circuit may be provided separately from the ring detection circuit 39.

If it is not determined that a shift instruction to a maintenance mode is entered (No at S5) and if it is not determined that an external telephone 26 is hooked up (No at S6), whether or not inversion of the telephone line 31 is detected is checked (S302). If it is not determined that inversion of the telephone line 31 is detected (No at S302), the process goes to S2 for continuing monitoring user operation and detection of inversion of the telephone line 31 with the signal detection mode of the semiconductor DAA 33 held in the ring signal detection mode.

On the other hand, if it is determined that inversion of the telephone line 31 is detected (Yes at S302), it means that the exchange 27 will transmit Caller ID data. Then, the CPU 11 executes Caller ID reception processing (S311) to receive the Caller ID data. Here, the Caller ID reception processing (S311) will be discussed with reference to a flowchart of FIG. 13.

Figure 13:
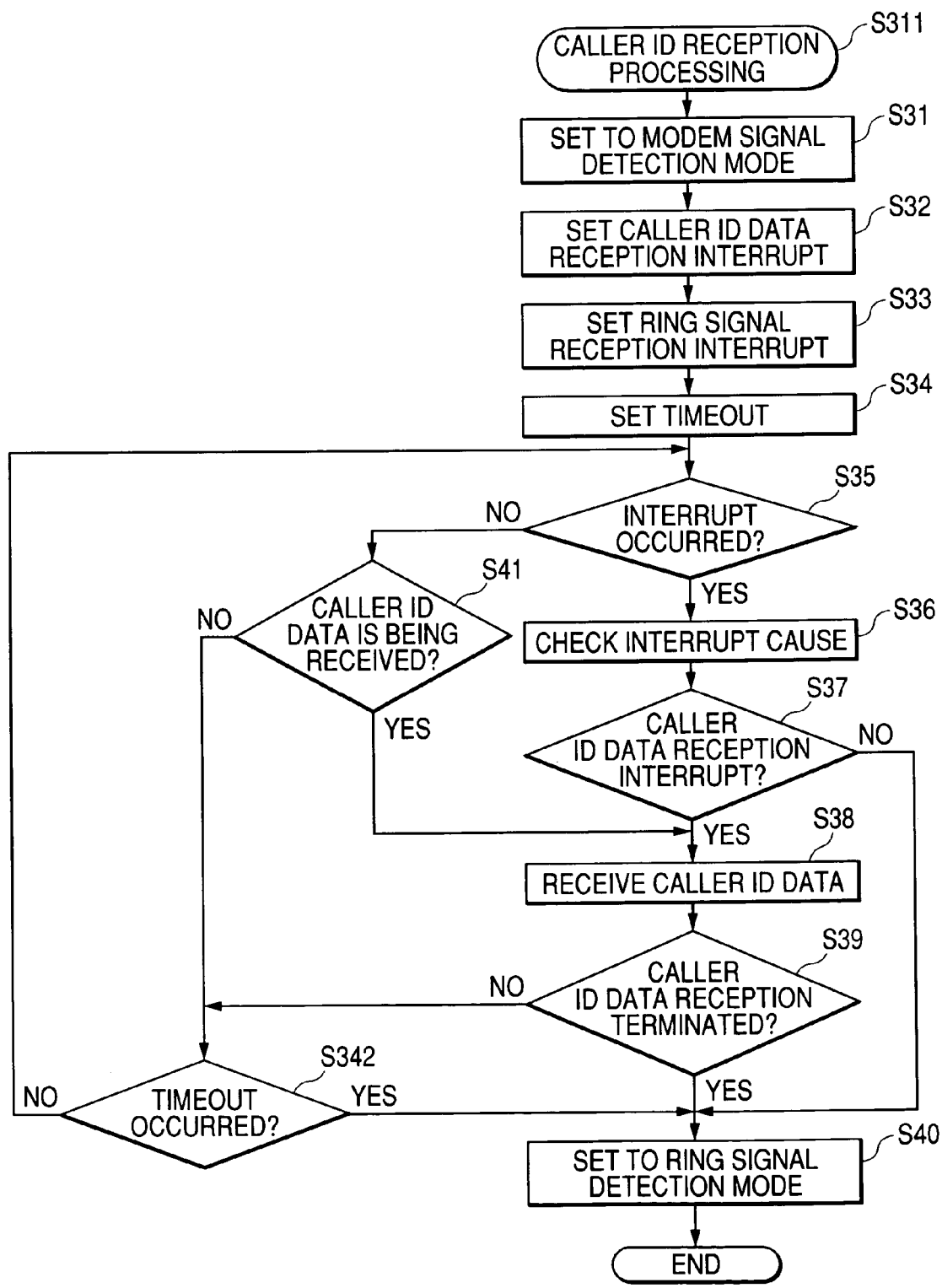
FIG. 13 is a flowchart to show Caller ID reception processing in the third embodiment of the invention.
Figure 14:
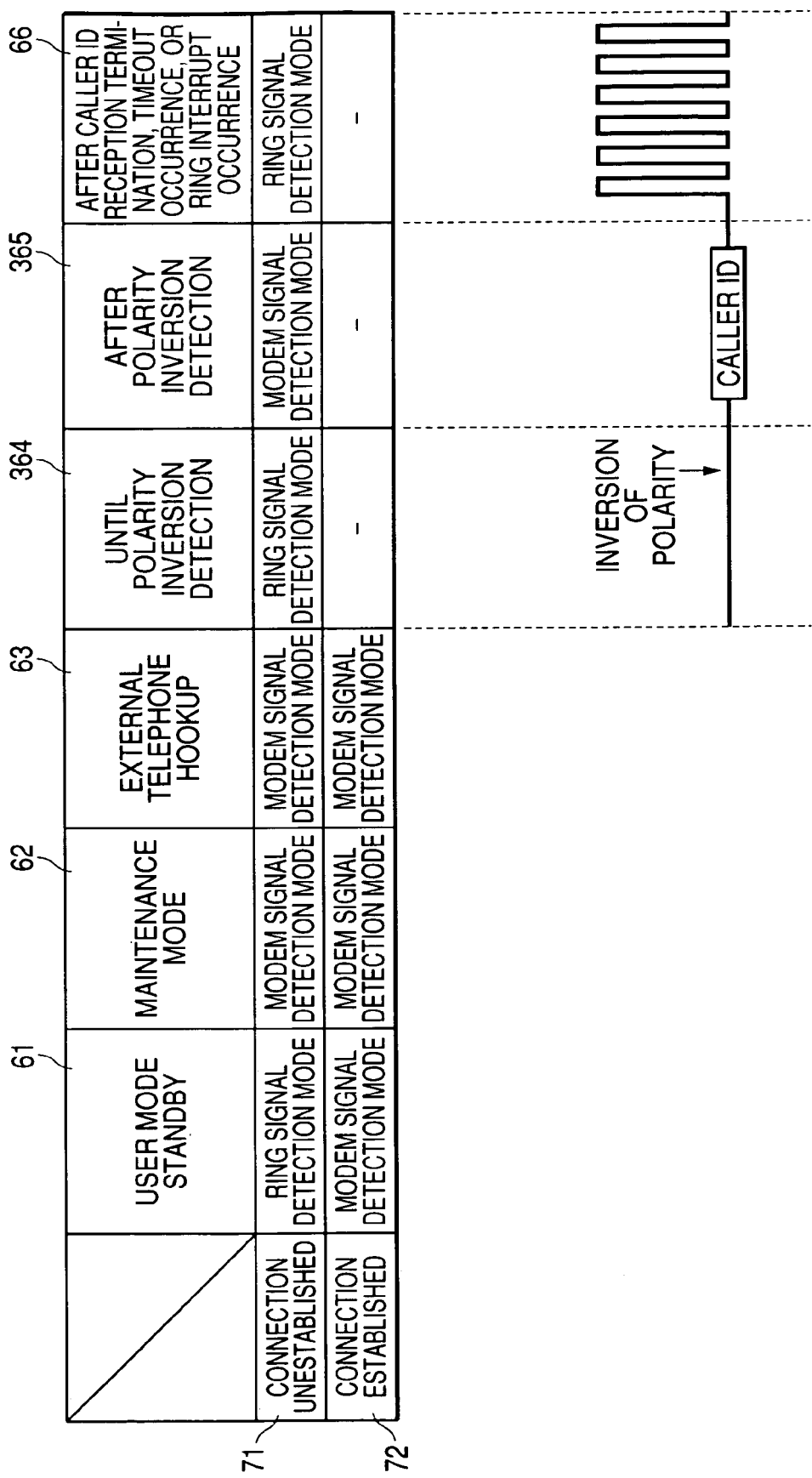
FIG. 14 is a drawing to show a switch table of a detection mode of a semiconductor DAA in the third embodiment of the invention.

FIG. 13 is a flowchart to show the Caller ID reception processing. The Caller ID reception processing is processing for receiving Caller ID data (see FIG. 10) transmitted from the exchange 27 before transmission of a ring signal after inversion of the telephone line 31. In the Caller ID reception processing (S311), setting processing is executed at S31 to S34 and then occurrence of an interrupt is checked (S35) and Caller ID data reception processing (S38), etc., is executed in response to the cause of the interrupt (S37) as in the first embodiment.

In the third embodiment, however, unlike the first embodiment, a ring signal is not yet transmitted from the exchange 27 at the execution stage of the Caller ID reception processing (S311) and therefore a ring tone is not produced in response to the ring signal. Thus, unlike the first embodiment, it is not necessary to check whether or not a connection through the telephone line 31 is established in response to producing a ring tone (see S43). Thus, if timeout does not occur (No at S342), the process goes to S35 without checking whether or not the connection through the line is established. On the other hand, if timeout occurs (Yes at S342), the process goes to S40 to switch the signal detection mode for reception of a ring signal.

Referring again to the flowcharts of FIGS. 11 and 12, after the Caller ID reception processing (S311) is executed, a ring signal is transmitted from the exchange 27 as described above and thus ring sound processing (S13) is executed to produce a ring tone in response to the ring signal.

Thus, according to the facsimile apparatus 1 in the third embodiment, if inversion of the line is detected and it is determined that a modem signal is to be detected, the signal detection mode of the semiconductor DAA can be switched into the modem signal detection mode, so that the Caller ID data transmitted from the exchange 27 can be detected reliably.

The facsimile apparatus has an instruction detection section that detects an instruction to shift into a maintenance mode where maintenance is performed, wherein if the instruction detection section detects the instruction to shift into the maintenance mode, the switch section switches the signal detection mode into the modem signal detection mode.

Therefore, if the instruction detection section detects that the instruction to shift into the maintenance mode, the switch section switches the signal detection mode into the modem signal detection mode and the modem signal detection section detects the modem signal.

If the instruction detection section detects that the instruction to shift into the maintenance mode and it is determined that a modem signal should be detected, the switch section switches the signal detection mode into the modem signal detection mode, so that the modem signal can be detected reliably.

The facsimile apparatus has a start signal detection section that detects an information terminal start signal transmitted from the exchange, wherein if the start signal detection section detects the information terminal start signal, the switch section switches the signal detection mode into the modem signal detection mode.

Therefore, if the start signal detection section detects the information terminal start signal (CAR signal) transmitted from the exchange, the switch section switches the signal detection mode into the modem signal detection mode and the modem signal detection section detects the modem signal transmitted after the information terminal start signal.

If the start signal detection section detects the information terminal start signal and it is determined that a modem signal should be detected, the switch section switches the signal detection mode into the modem signal detection mode, so that the modem signal such as Caller ID data, etc., transmitted from the exchange after the information terminal start signal can be detected reliably.

The facsimile apparatus has a polarity inversion detection section that detects an inversion of a polarity of a line connected to the network, wherein if the polarity inversion detection section detects the inversion of the polarity of the line, the switch section switches the signal detection mode into the modem signal detection mode.

Therefore, if the polarity inversion detection section detects the inversion of the polarity of the line connected the network, the switch section switches the signal detection mode into the modem signal detection mode and the modem signal detection section detects the modem signal transmitted after the inversion of the polarity.

If the polarity inversion detection section detects the inversion of the polarity of the line and it is determined that a modem signal should be detected, the switch section switches the signal detection mode into the modem signal detection mode, so that the modem signal such as Caller ID data, etc., transmitted from the exchange after the inversion of the polarity can be detected reliably.

The facsimile apparatus has an interrupt section that generates an interrupt signal when the ring signal is received, wherein if the interrupt section generates the interrupt signal in the modem signal detection mode, the switch section switches the signal detection mode into the ring signal detection mode.

Therefore, if the interrupt section generates the interrupt signal, the switch section switches the signal detection mode into the ring signal detection mode and the ring signal detection section detects the ring signal.

If the interrupt section generates the interrupt signal by receiving the ring signal in the modem signal detection mode and it is determined that a ring signal should be detected, the switch section switches the signal detection mode into the ring signal detection mode, so that the ring signal can be checked by monitoring the interrupt signal even in the modem signal detection mode and the ring signal can be detected reliably without missing the ring signal transmitted from the exchange.

In the facsimile apparatus, when a caller identification information transmitted after the ring signal is completely received, the information terminal start signal is completely received, or the inversion of the polarity of the line is completely performed in the modem signal detection mode, the switch section switches the signal detection mode into the ring signal detection mode.

Therefore, when the caller identification information transmitted after the ring signal is completely received, the information terminal start signal is completely received, or the inversion of the polarity of the line is completely performed in the modem signal detection mode, the switch section switches the signal detection mode into the ring signal detection mode and the ring signal detection section detects the ring signal after the caller identification information.

If the caller identification information transmitted after the ring signal is completely received, the information terminal start signal is completely received, or the inversion of the polarity of the line is completely performed in the modem signal detection mode and it is determined that a ring signal should be detected, the switch section switches the signal detection mode into the ring signal detection mode, so that the ring signal transmitted from the exchange after the caller identification information can be detected reliably without missing the ring signal.

The facsimile apparatus has a timer section that counts an elapsed time since the signal detection mode is switched into the modem signal detection mode; and an elapsed time determination section that determines whether or not the timer section counts a predetermined time, wherein if the elapsed time determination section determines that the timer section counts the predetermined time in the modem signal detection mode, the switch section switches the signal detection mode into the ring signal detection mode.

Therefore, if the elapsed time determination section determines that the timer section counts the predetermined time, the switch section switches the signal detection mode into the ring signal detection mode and the ring signal detection section detects the ring signal.

If the elapsed time determination section determines that the timer section counts the predetermined time, namely, if the caller identification information is not completely received for some reason, the switch section switches the signal detection mode into the ring signal detection mode, so that the ring signal transmitted from the exchange can be detected reliably without missing the ring signal.

The facsimile apparatus has a line state detection section that detects a connection state of a line connected to the network, wherein if the line state detection section detects that a connection is established through the line, the switch section switches the signal detection mode into the modem signal detection mode.

Therefore, if the line state detection section detects that a connection is established through the line, the switch section switches the signal detection mode into the modem signal detection mode and the modem signal detection section detects the modem signal.

If the line state detection section detects that a connection is established through the line and it is determined that a modem signal should be detected, the switch section switches the signal detection mode into the modem signal detection mode, so that the modem signal transmitted while the connection is established can be detected reliably.

In the facsimile apparatus, the modem signal detection section and the ring signal detection section are provided in a semiconductor DAA. Therefore, the semiconductor DAA can simultaneously detect the modem signal or the ring signal.

Although the invention has been described based on the embodiments, it is to be understood that the invention is not limited to the specific embodiments thereof and modifications and changes may be made without departing from the spirit and scope of the invention.

What is claimed is:

1. A facsimile apparatus comprising:
    a line I/F section that transmits and receives a signal through a network to which an exchange is connected;
    a modem signal detection section that detects a modem signal transmitted through the network;
    a ring signal detection section that detects a ring signal transmitted through the network from the exchange;
    a switch section that switches a signal detection mode of the line I/F section between a ring signal detection mode in which the ring signal detection section detects the ring signal and a modem signal detection mode in which the modem signal detection section detects the modem signal, such that the modem signal is not detected during the ring signal detection mode and the ring signal is not detected during the modem signal detection mode;
    an interrupt section that generates an interrupt signal when the ring signal is received; and
    an operating state determination section that determines an operating state of the facsimile apparatus;
    wherein:
        if the operating state determination section determines that the facsimile apparatus is in a standby mode where the facsimile apparatus enables to be usually used, the switch section switches the signal detection mode into the ring signal detection mode; and
        if the interrupt section generates the interrupt signal in the modern signal detection mode, the switch section switches the signal detection mode into the ring signal detection mode.

2. The facsimile apparatus according to claim 1, further comprising:
    a hookup detection section that detects whether or not an external telephone connected to the facsimile apparatus is hooked up;
    wherein if the hookup detection section detects the external telephone being hooked up, the switch section switches the signal detection mode into the modem signal detection mode.

3. The facsimile apparatus according to claim 1, further comprising:
    a start signal detection section that detects an information terminal start signal transmitted from the exchange,
    wherein if the start signal detection section detects the information terminal start signal, the switch section switches the signal detection mode into the modem signal detection mode.

4. The facsimile apparatus according to claim 3,
wherein when a caller identification information transmitted after the information terminal start signal is completely received in the modem signal detection mode, the switch section switches the signal detection mode into the ring signal detection mode.

5. The facsimile apparatus according to claim 1, further comprising:
a line state detection section that detects a connection state of a line connected to the network,
wherein if the line state detection section detects that a connection is established through the line, the switch section switches the signal detection mode into the modem signal detection mode.

6. The facsimile apparatus according to claim 1,
wherein the modem signal detection section and the ring signal detection section are provided in a semiconductor DAA.

7. A facsimile apparatus comprising:
a line I/F section that transmits and receives a signal through a network to which an exchange is connected;
a modem signal detection section that detects a modem signal transmitted through the network;
a ring signal detection section that detects a ring signal transmitted through the network from the exchange;
a switch section that switches a signal detection mode of the line I/F section between a ring signal detection mode in which the ring signal detection section detects the ring signal and a modem signal detection mode in which the modem signal detection section detects the modem signal, such that the modem signal is not detected during the ring signal detection mode and the ring signal is not detected during the modem signal detection mode;
an operating state determination section that determines an operating state of the facsimile apparatus; and
an instruction detection section that detects an instruction to shift into a maintenance mode where maintenance is performed;
wherein:
if the operating state determination section determines that the facsimile apparatus is in a standby mode where the facsimile apparatus enables to be usually used, the switch section switches the signal detection mode into the ring signal detection mode; and
if the instruction detection section detects the instruction to shift into the maintenance mode, the switch section switches the signal detection mode into the modem signal detection mode.

8. A facsimile apparatus comprising:
a line I/F section that transmits and receives a signal through a network to which an exchange is connected;
a modem signal detection section that detects a modem signal transmitted through the network;
a ring signal detection section that detects a ring signal transmitted through the network from the exchange;
a switch section that switches a signal detection mode of the line I/F section between a ring signal detection mode in which the ring signal detection section detects the ring signal and a modem signal detection mode in which the modem signal detection section detects the modem signal; and
a first ring detection section that detects a termination of the first ring signal transmitted from the exchange in the ring signal detection mode,
wherein if the first ring detection section detects the termination of the first ring signal, the switch section switches the signal detection mode into the modem signal detection mode.

9. The facsimile apparatus according to claim 8,
wherein when a caller identification information transmitted after the ring signal is completely received in the modem signal detection mode, the switch section switches the signal detection mode into the ring signal detection mode.

10. The facsimile apparatus according to claim 8, further comprising:
a timer section that counts an elapsed time since the signal detection mode is switched into the modem signal detection mode; and
an elapsed time determination section that determines whether or not the timer section counts a predetermined time,
wherein if the elapsed time determination section determines that the timer section counts the predetermined time in the modem signal detection mode, the switch section switches the signal detection mode into the ring signal detection mode.

11. A facsimile apparatus comprising:
a line I/F section that transmits and receives a signal through a network to which an exchange is connected;
a modem signal detection section that detects a modem signal transmitted through the network;
a ring signal detection section that detects a ring signal transmitted through the network from the exchange;
a switch section that switches a signal detection mode of the line I/F section between a ring signal detection mode in which the ring signal detection section detects the ring signal and a modem signal detection mode in which the modem signal detection section detects the modem signal;
an operating state determination section that determines an operating state of the facsimile apparatus; and
a polarity inversion detection section that detects an inversion of a polarity of a line connected to the network;
wherein:
if the operating state determination section determines that the facsimile apparatus is in a standby mode where the facsimile apparatus enables to be usually used, the switch section switches the signal detection mode into the ring signal detection mode; and
if the polarity inversion detection section detects the inversion of the polarity of the line, the switch section switches the signal detection mode into the modem signal detection mode.

12. A facsimile apparatus comprising:
a line I/F section that transmits and receives a signal through a network to which an exchange is connected;
a modem signal detection section that detects a modem signal transmitted through the network;
a ring signal detection section that detects a ring signal transmitted through the network from the exchange;
a switch section that switches a signal detection mode of the line I/F section between a ring signal detection mode in which the ring signal detection section detects the ring signal and a modem signal detection mode in which the modem signal detection section detects the modem signal, such that the modem signal is not detected during the ring signal detection mode and the ring signal is not detected during the modem signal detection mode;

an operating state determination section that determines an operating state of the facsimile apparatus; and a start signal detection section that detects an information terminal start signal transmitted from the exchange;

wherein:

if the operating state determination section determines that the facsimile apparatus is in a standby mode where the facsimile apparatus enables to be usually used, the switch section switches the signal detection mode into the ring signal detection mode;

if the start signal detection section detects the information terminal start signal, the switch section switches the signal detection mode into the modem signal detection mode; and when a caller identification information transmitted after the inversion of the polarity of the line is completely performed in the modem signal detection mode, the switch section switches the signal detection mode into the ring signal detection mode.

* * * * *